United States Patent
Suzuki et al.

(10) Patent No.: US 6,590,902 B1
(45) Date of Patent: Jul. 8, 2003

(54) LAYER-CODED DATA TRANSMITTING APPARATUS

(75) Inventors: Toshiaki Suzuki, Kokubunji (JP); Satoshi Yoshizawa, Saratoga, CA (US); Mitsuru Ikezawa, Asaka (JP); Itaru Mimura, Sayama (JP); Tatsuya Kameyama, Hachioji (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/389,455

(22) Filed: Sep. 3, 1999

(30) Foreign Application Priority Data

Sep. 3, 1998 (JP) .......................................... 10-249308

(51) Int. Cl.[7] ................................................. H04J 3/16
(52) U.S. Cl. ..................... 370/465; 348/384.1; 382/232; 382/276
(58) Field of Search ................................. 370/229, 230, 370/389, 392, 395.1, 395.42, 395.52, 395.6, 902, 903, 464, 465, 469, 476; 375/240.27, 240.2, 240.26; 348/385.1, 395.1, 425.3, 384.1, 387.1, 390.1; 382/232, 276

(56) References Cited

U.S. PATENT DOCUMENTS

| | | | |
|---|---|---|---|
| 5,617,541 A | * 4/1997 | Albanese et al. | 709/207 |
| 5,648,960 A | * 7/1997 | Sakazaki et al. | 370/498 |
| 5,703,889 A | * 12/1997 | Shimoda et al. | 714/809 |
| 5,771,081 A | * 6/1998 | Lee | 375/240.27 |
| 5,852,706 A | * 12/1998 | Ogikubo et al. | 386/111 |
| 6,172,988 B1 | * 1/2001 | Tiernan et al. | 370/465 |
| 6,317,462 B1 | * 11/2001 | Boyce | 375/240.27 |
| 2001/0048662 A1 | * 12/2001 | Suzuki et al. | 370/230 |

FOREIGN PATENT DOCUMENTS

| | | | | |
|---|---|---|---|---|
| JP | A-2-58938 | * 2/1990 | | H04B/14/06 |
| JP | A-2-86241 | * 3/1990 | | H04L/12/56 |
| JP | A-3-22780 | * 1/1991 | | H04N/7/13 |
| JP | A-4-83488 | * 3/1992 | | H04N/7/13 |
| JP | A-6-125361 | * 5/1994 | | H04L/12/56 |
| JP | A-6-339137 | * 12/1994 | | H04N/7/14 |
| JP | A-10-23418 | * 1/1998 | | H04N/7/30 |

OTHER PUBLICATIONS

The Journal of the Institute of Image Information and Television Engineers. vol. 52, No. 6, 1998, pp. 863–870.*

Cuenca et al. "Packing Scheme for Layered Coding MPEG–2 Video Transmission Over ATM Based Networks". IEEE ATM Workshop 1997. May 25–28, 1997. pp. 168–177.*

Neufeld et al. "Multimedia Support in a Differentiated Serivces Internet". Univeristy Of British Columbia. Mar. 2, 1999. pp. 10–12.*

Khademi et al. "Performance and statistical analysis of two–layer MPEG coding algorthims for ATM networks". IEEE Proceedings–Communications. Jun. 1996. pp. 155–161.*

Zhu et al. "Coding and Cell–Loss Recovery in DCT–Based Packet Video". Jun. 1993. pp. 248–258.*

* cited by examiner

*Primary Examiner*—Melvin Marcelo
*Assistant Examiner*—Derrick W. Ferris
(74) *Attorney, Agent, or Firm*—Antonelli, Terry, Stout & Kraus, LLP

(57) ABSTRACT

When one-video program data (layer-coded data) of a plurality of layers is transmitted in a single channel, a video signal is layer-coded in an MPEG system, the layer-coded ES (Elementary Stream) data is converted to a PES (Packetized Elementary Stream) for each layer, and the PES is then converted to a RTP (Real-Time Protocol) packet, which is then converted to a UDP (User Datagram Protocol). An identifier is then annexed to a UDP packet data for each layer to form an IP (Internet Protocol) packet.

2 Claims, 5 Drawing Sheets

FIG.2

| DATA | HIGH FREQUENCY COMPONENT DATA OF I-FRAME | LOW FREQUENCY COMPONENT DATA OF I-FRAME | HIGH FREQUENCY COMPONENT DATA OF P-FRAME | LOW FREQUENCY COMPONENT DATA OF P-FRAME | HIGH FREQUENCY COMPONENT DATA OF B-FRAME | LOW FREQUENCY COMPONENT DATA OF B-FRAME |
|---|---|---|---|---|---|---|
| START CODE | 0x000001B2 | 0x00000100 | 0x000001B2 | 0x00000100 | 0x000001B2 | 0x00000100 |
| CODE FOR LAYER | 101 | 001 | 110 | 010 | 111 | 011 |

LAYER-CODED DATA TRANSMITTING APPARATUS

BACKGROUND OF THE INVENTION

1. Field of the Invention

The present invention relates to compressed coded data transmitting systems, and more particularly to an apparatus for packetizing layer-coded video data and for transmitting it.

2. Description of the Related Art

In the transmission of video data, a system is known which divides coded data which contains DCT (Discreet Cosine Transform) components into low and high frequency component data and packetizes them individually in a H.261 encoding system which is an international standard for video conference, as described in JP-A-10-23418 laid-open on Jan. 23, 1998. In this invention, if data to be transmitted comprises low frequency components, a flag indicative of high priority is annexed to a packet for transmitting the data whereas if the data contains high frequency components, a flag indicative of low priority is annexed to the data for transmitting purposes. A gateway (which is a packet video speed converter capable of converting a video stream speed) disposed on a network discards the packets to which the flag indicative of low priority is annexed (high frequency component data) when the network becomes congested, alleviate the congested state of the network to thereby prevent a deterioration in the video quality.

For example, "Encoding, Transmitting, and Controlling System in Video Multicast", The Journal of the Institute of Image Information and Television Engineers, Vol. 52, No. 6, pp. 863–870(1998-6) describes a layer-coded data transmission controlling system in which layer-coded video data is transmitted from a sever to a client in a multi-channel system using an IP address, transmit/receive code port numbers, etc. In this system, a total of six kinds of encoded data of low and high frequency components of respective I, P and B frame data, which an MPEG encoding system (Generic Coding of Moving Pictures and Associated Audio: Video, ISO/IEC 13818-2) which is an international standard prescribes for layering the video data, are transmitted from the sever to the client, using a plurality of channels. In order to reproduce the P frame data among the I, P and B frame data which the MPEG encoding system prescribes, the I frame data is required. In order to reproduce the B frame data, the I and P frame data are required. As a result, the respective decreasing significances are placed on the I, P and B frames in this order. The low frequency components of each frame which represent its basic contour are important compared to its high frequency components which represent the details of the frame. There are a total of six leveled significances, inclusive of those of the I, P and B frame structures. By transmitting those six leveled data, using a plurality of channels, only data for a layer which the client requests can be transmitted.

JP-A-6-339137 laid-open on Dec. 6, 1994 describes on its front page that "an image signal is packetized in packet assembling section 13 for each layer and is transmitted from transmitting section 14."

JP-A-3-22780 laid-open on Jan. 31, 1991 describes on page 4, lower right column, line 18—page 5, upper left column, line 2 that "a first group of packets are formed of those image signal components, loss of which will cause a small extent of degradation of image quality and a second group of packets are formed of those image signal components, loss of which will cause a large extent of degradation of image quality, and a high priority is given to the second group of packets so that discard of the second group of packets is hardly effected."

JP-A-2-58938 laid-open on Feb. 28, 1990 describes in its claim that "means for layer-structuring the coded information into basic blocks for decoding and into additional blocks for interpolating them and thereafter packetizing the resulting information for transmission".

JP-A-2-86241 laid-open on Mar. 27, 1990 describes in its claim that "coded information is layer-structured into those portions which will exert small influence on the image quality and into those portions which will exert large influence on the image quality, and several blocks are formed into a packet for each portion".

JP-A-6-125361 laid-open on May 6, 1994 discloses a speech packet communication system intended to suppress degradation of speech quality when a packet is discarded.

JP-A-4-83488 laid-open on Mar. 17, 1992 discloses use of the layer-coding technique and the burst error correction technique in an ATM image signal transmission.

Since video data of a plurality of layers are transmitted through a plurality of channels in the conventional system, channels whose number equals the product of the number of video programs to be transmitted and the number of program layers are required. Thus, a plurality of addresses and ports are be consumed to transmit one video program.

When packet discarding occurs due to congestion of the transmission network, disordered packet discarding would lead to discard of data important for video reproduction, which can greatly affect the video reproduction. It is preferable that as described above with reference to the prior art, the I, P and B frame structures and the significances of the frequency component data are used to positively discard the component data, starting with the least significant component data when the network is congested. When one-video program data of a plurality of layers is transmitted through one channel in packets where components data belonging to different layers, for example, the low and high frequency components data of the B frame, are present in a mixed state, a router which has a packet discarding function in the network cannot discard only the high frequency component data of the B frame.

SUMMARY OF THE INVENTION

It is therefore an object of the present invention to provide a layer-coded video data transmitting apparatus where one-video program data of a plurality of layers is transmitted through one channel, and a router which has a packet discarding function in the transmission network can discard only specified layer data.

In order to solve the above problems, according to one aspect of the present invention, there is provided a layer-coded data transmitting apparatus for transmitting layer-coded data in a single channel, which apparatus packetizes layer-coded data so that a packet for transmitting the layer-coded data contains only data belonging to the same layer.

According to another aspect of the present invention, there is provided a layer-coded data transmitting apparatus for transmitting layer-coded data in a single channel, which apparatus divides into low and high frequency component data each of intra-coded image (hereinafter referred to as "I frame") data, prediction-coded image (hereinafter referred to as "P frame") data, and bidirectional prediction-coded image (hereinafter referred to as "B frame") data, which a video signal compressing/encoding system prescribes; and transmits in different packets the respective low and high frequency component data of each of the I, P and B frame data.

According to still another aspect of the present invention, there is provided a layer-coded data transmitting apparatus for transmitting layer-coded data in a single channel, comprising means for converting data belonging to each of layers of an elementary stream (hereinafter refereed to as "ES") to packetized elementary stream (hereinafter referred to as "PES") data, and wherein the converting means converts the ES data so that only ES data belonging to the same layer is contained in a single PES packet. The apparatus further comprises means for packetizing the PES packet to a real time protocol (hereinafter referred to as "RTP") packet for each layer data, so that only the RTP packet data belonging to the same layer is contained in a single RTP packet which transmits the RTP packet; means for packetizing the RTP packet to a user datagram protocol (hereinafter referred to as "UDP") packet for each layer data, so that only the RTP packet data belonging to the same layer is contained in a single UDP packet which trasmits the UDP packet; and means for packetizing the UDP packet to an internet protocol (hereinafter referred to as "IP") packet for each layer data, so that only the UDP packet data belonging to the same layer is contained in a single IP packet which transmits the IP; packet.

According to a further aspect of the present invention, there is provided a layer-coded data transmitting apparatus for transmitting layer-coded data in a single channel, comprising: means for converting layer-coded data belonging to each of layers of an elementary stream (hereinafter refereed to as "ES") to packetized elementary stream (hereinafter referred to as "PES") data; first packetizing means for packetizing the PES data to a real time protocol (hereinafter referred to as "RTP") packet for each layer data; and second packetizing means for packetizing the RTP packet to a user datagram protocol (hereinafter referred to as "UDP") packet for each layer data, and wherein: the converting means converts the ES data so that only ES data belonging to the same layer is contained in a single PES packet which transmits an ES data; the first packetizing means divides the PES packet belonging to the same layer into a plurality of RTP packets, each of which includes the divided PES packet data and a RTP header annexed to the divided PES packet, so that the length of the RTP packet is not more than a maximum data length in which the UDP packet is transmittable; and the second packetizing means packetizes the RTP packet so that only the RTP packet data belonging to the same layer is contained in a single UDP packet.

According to a still further aspect of the present invention, there is provided a layer-coded data transmitting apparatus for transmitting layer-coded data in a single channel, comprising: means for converting layer-coded data belonging to each of layers of an elementary stream (hereinafter refereed to as "ES") to packetized elementary stream (hereinafter referred to as "PES") data; and means for packetizing the PES packet to a user datagram protocol (hereinafter referred to as "UDP") packet for each layer data, and wherein: the converting means converts the layer-coded data so that only the elementary stream data belonging to the same layer is contained in a single PES packet; and when the packetizing means divides the PES packet data belonging to the same layer into a plurality of UDP packets, said packetizing means annexes at a predetermined position in each of the UDP packets information representing a position of a datagram of that divided UDP packet in the undivided PES packet.

According to a further aspect of the present invention, there is provided a layer-coded data transmitting apparatus for transmitting layer-coded data in a single channel, which apparatus packetizes layer-coded data so that an internet protocol (hereinafter referred to as "IP") packet for transmitting the layer-coded data contains only data belonging to the same layer; and transmits the IP packet.

According to a still further aspect of the present invention, there is provided a layer-coded data transmitting apparatus for transmitting layer-coded data in a single channel, which apparatus divides into low and high frequency component data each of intra-encoded image (hereinafter referred to as "I frame") data, prediction-encoded image (hereinafter refereed to as "P frame") data, and bidirectional prediction-encoded image (hereinafter referred to as "B frame") data, which a video signal compressing/encoding system prescribes; and forms an internet protocol (hereinafter referred to as "IP") packet which transmits only each of the low and high frequency component data of each of the I, P and B frames; and transmits the respective IP packets.

BRIEF DESCRIPTION OF THE DRAWINGS

FIG. 2 illustrates an identifier applied to each layer data;

DETAILED DESCRIPTION OF THE PREFERRED EMBODIMENT

Figure 1:
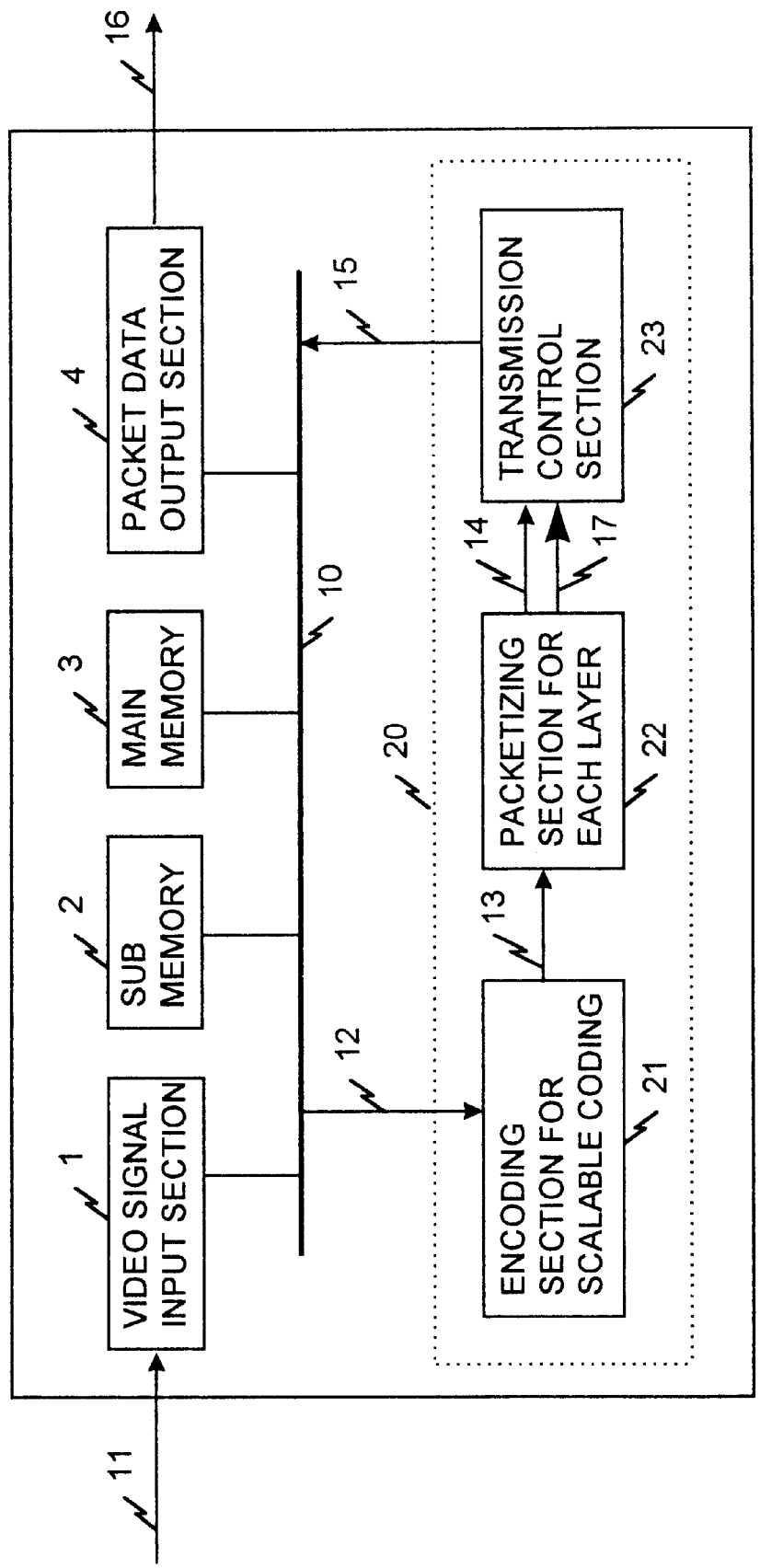
FIG. 1 is a block diagram of a layer-coded data transmitting apparatus according to an embodiment of the present invention.

A preferred embodiment of the present invention will be described in more detail with reference to the drawings. FIG. 1 illustrates a layer-coded data transmitting apparatus according to the embodiment of the present invention. The layer-coded data transmitting apparatus includes a video signal input section 1, a central processing unit 20, a sub memory 2 which contains a processing program, a main memory 3 which temporarily stores data under operation, and a packet data output section 4 which outputs packetized layer video data, connected to a bus 10. The program stored in the sub memory 2 includes an encoding section for scalable coding 21 which layer-codes a video signal, a packtizing section 22 which packetizes layer-coded data for each layer, and a transmission control section 23 which transmits the packtized data to a network.

Then, the operation of the inventive layer-coded video data transmitting apparatus will be described next. The layer-coded data transmitting apparatus of FIG. 1 first loads the processing program stored in the sub memory 2 on the central processing unit 20 and then starts transmission of the layer-coded video data. The processing operation of the apparatus will be described later in more detail with reference to FIGS. 4 and 5. After the transmission of the layer-coded video data has started, an analog video signal 11 is inputted to the video signal input section 1, which converts the analog video signal 11 to a digital signal 12, which is then sent to the encoding section for scaleable coding 21 of the central processing unit 20. The encoding section for scalable encoding 21 receives and layer-codes the digital video data 12, annexes an identifier (including a start code and a layer code) to the coded data for each layer, and sends it as layer-coded video data 13 to the packetizing section for each layer 22. The identifier will be described later in more detail with reference to FIG. 2. The packetizing section 22 receives the data 13 for each layer to which its identifier is annexed, and sends the transmission control section 23 a signal 14 packetized for each layer on the basis of the identifier annexed to the head of the data. The packetizing section 22 sends the transmission control section 23 as packet identifying data 17 a layer code corresponding to a type of the layer video data sent to the transmission control section 23. For example, when a high layer data (high frequency components of a DCT conversion coefficient) of an I frame is transmitted to the transmission control section 23, "5" which represents the layer code (in a binary notation, "101") is transmitted as packet identifying data 17 to the transmission control section 23. For example, when a basic layer data of the P frame (low frequency components of the DCT conversion coefficient) is transmitted to the transmission control section 23, "2" (in the binary notation, "010") is transmitted as layer code data 17 for a packet identifier to the transmission control section 23. The transmission control section 23 converts the received packet data 14 for each layer to an IP packet, annexes the layer code data 17 received from the packetizing section 22 to the header of the IP packet, and outputs it through the packet data output section 4 to the transmission network. When information on the layer code data 17 which identifies data for each layer is annexed to the header of the IP packet, a TOS (Type Of Service) field, for example, is available.

FIG. 2 illustrates an identifier (including a start code and a layer code) annexed to each layer data. A start code "0x000001B2" is annexed to the header of high frequency component data of the I frame, and a code for layer (code layer) "101" is annexed. In the case of the low frequency component data of the I frame, a start code "0x00000100" is annexed to the head of the data, and a layer code "001" is annexed. Similarly, a start code and a layer code are annexed to the head of each of high and low frequency data of each of the P and B frames. The values of the start codes and layer codes of FIG. 2 are as an example, and other values may be used instead, of course.

Figure 3:
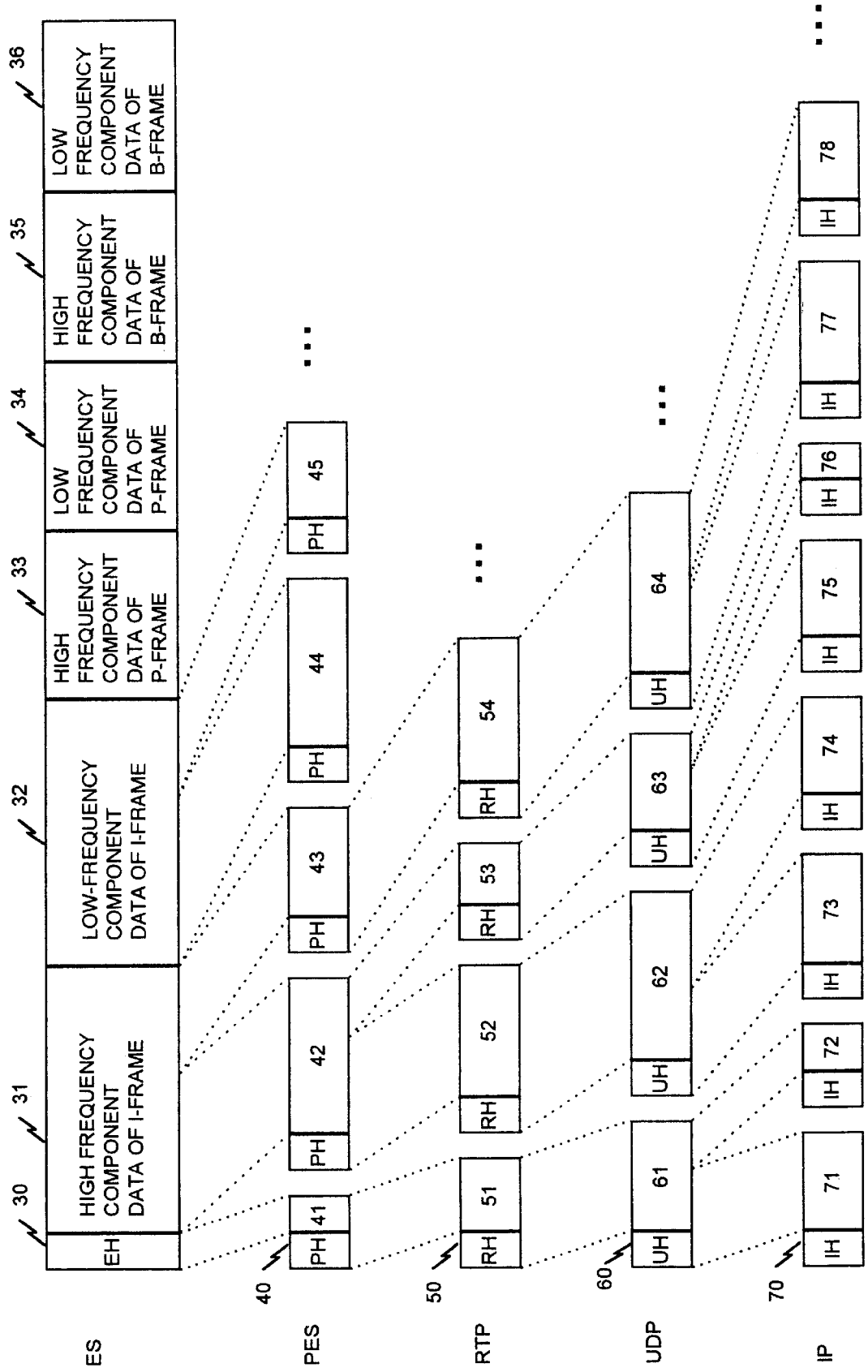
FIG. 3 illustrates a process for sequentially converting layer-structured ES data to a PES packet, a RTP packet, an UDP packet and an IP packet in this order.

FIG. 3 illustrates a process for sequentially converting layer-structured ES (Elementary Stream) data through a PES (Packetized Elementary Stream), a RTP (Real-Time Protocol) packet and a UDP (User Datagram Protocol) packet to an IP (Internet Protocol) packet in this order. The process for converting the ES data via the PES and RTP packets to the UDP packet data is performed by the packetizing section 22 of FIG. 1. The process for converting the UDP packet to the IP packet is performed by the transmission control unit 23 of FIG. 1.

First, conversion of the ES data to the PES packet will be described. EH 30 of FIG. 3 denotes a header of the ES data. Annexed to the head of the high frequency component data of the I frame 31 are the start code "0x000001B2" and the layer code "101" of FIG. 2. Annexed to the head of the low frequency component data of the I frame 32 are the start code "0x00000100" and the layer code "001" of FIG. 2. Similarly, annexed to the respective heads of the layer data 33–36 are corresponding identifiers of FIG. 2. First, the header EH 30 of the ES data is converted to the PES. In FIG. 3, since the length of the ES header 30 is shorter than the maximum length of the PES packet data field, the EH 30 data is converted to one PES packet. PH 40 denotes PES header data. Then, high frequency component data of the I frame (hereinafter referred to as I (H) data) 31 is converted to a PES packet based on the identifier (including a start code and a layer code) of FIG. 2. FIG. 3 shows that the length of the I (H) data 31 exceeds the maximum length of the PES packet data field, which is then converted to two PES packets 42 and 43. A process for converting the ES to the PES packet will be described later with reference to FIG. 4. Similarly, low frequency component data of the I frame (hereinafter referred to as I (L) data) 32 is converted to two PES packets 44 and 45 based on the identifier described with reference to FIG. 2. Similarly, the respective layer data 33–36 are converted to corresponding PES packets.

The process for converting the PES packet to the RTP packet will be described next. In this case, it is presupposed that after the PES packet is converted to the RTP packet, the same is then converted to the UDP packet. First, a data length in which the RTP packet is transmittable will be described based on a data length in which the UDP packet is transmittable. Assume now that the length of the UDP packet is 8192 bytes, and that the UDP header length is 8 bytes. In this case, the data length which the UDP packet can transmit is 8184 bytes. Assume also that the length of the RTP header is 16 bytes. In this case, subtraction of 16 bytes from the data in which the UDP packet transmits provides 8168 bytes, which is an actually transmittable data length. Thus, when the PES packet is converted to the RTP packet, the PES packet is required to be divided so that the divided data does not exceeds 8168 bytes and then converted to the RTP packet. When the length of the RTP data divided PES packet is longer than 8168 bytes, the RTP packet is converted to plural UDP packets as the length of the RTP packet with the RTP header exceeds the maximum data length in which a UDP packet is transmittable. In that case, when there are differences between the sending sequence of the UDP packets and receiving sequence of the UDP packets, it is impossible to reproduce the RTP packets from receiving the UDP packets. When the length of the RTP data divided PES packet is not longer than 8168 bytes, the RTP packet is converted to single UDP packet. In this case, when there are differences between the sending sequence of the UDP packets and receiving sequence of the UDP packets, it is possible to re-order the sending sequence of the UDP packets from receiving sequence of the UDP packets by using the sequence number of the RTP header. In addition, it is possible to reproduce the RTP packets from receiving the UDP packets. Thus, the transmittable data length of the RTP packet is determined. Now, the process for converting the PES packet to the RTP packet will be described. When the PES packet composed of data 40 and 41 has a length of not more than 8168 bytes, a RTP header 50 is annexed to the head of the PES packet to form the RTP packet. In the case of a PES packet composed of data 40 and 42, it is divided into two RTP packet data 52 and 53 since its packet length exceeds 8168 bytes. A RTP header 50 is then annexed to each of the data 52 and 53 to form RTP packets. Similarly, when the PES packet composed of 40, 43, 44, 45 has a length of not more than 8168 bytes, it is converted to a single RTP packet whereas when it is more than 8168 bytes, it is divided in units of 8168 bytes and then a RTP header is annexed to each of the divided data to form RTP packets. While the description has been made based on the UDP packet length, UDP header length and RTP header length set at predetermined respective constant values, their respective lengths may be set at other desired values and the PES packet may be accordingly divided and packetized. For example, the UDP packet length may be set at 4096 bytes.

Then, the process for forming the UDP packet from the RTP packet will be described. The length of the RTP packet composed of data 50 and 51 is divided into data lengths in which the resulting UDP packets are transmittable, as described above. Thus, a UDP packet header 60 is annexed to each of the RTP packets without changing the packet lengths to form the UDP packets. Similarly, a UDP packet header is annexed to each of the heads of the RTP packets each composed of an RTP packet header 50 and a respective one of RTP heads 52, 53 and 54 to form respective UDP packets. While the packetizing process which includes the conversion of the PES packet to the RTP packet and thence to the UDP packet has been described, the PES packet can be directly converted to the UDP packet. While the packetizing process has been described, using the packet and header lengths set at corresponding predetermined values, other set values may be used instead.

Last, the process for converting the UDP packet to the IP packet will be described. When the UDP packet basically has a data length shorter than that in which the IP packet is transmittable, an IP packet header is annexed to the head of the UDP packet to form the IP packet. When the length of the UDP packet exceeds a data length in which the IP packet is transmittable, the UDP packet is divided into data having lengths in which the IP packet is transmittable, and an IP packet header is annexed to each of the divided UDP data to form IP packets. FIG. 3 shows a UDP packet composed of data 60 and 61 where the packet length exceeds a data length in which the IP packet is transmittable. The UDP packet is divided into two data 71 and 72, and then an IP packet header is annexed to each of the heads of the data 71 and 72 to form IP packets. Likewise, UDP packets each composed of a packet header 60 and a respective one of data 62, 63 and 64 are divided into data having lengths in which the IP packet is transmittable, and an IP packet header 70 is annexed to each of the heads of the divided data to form the IP packets.

Figure 4:
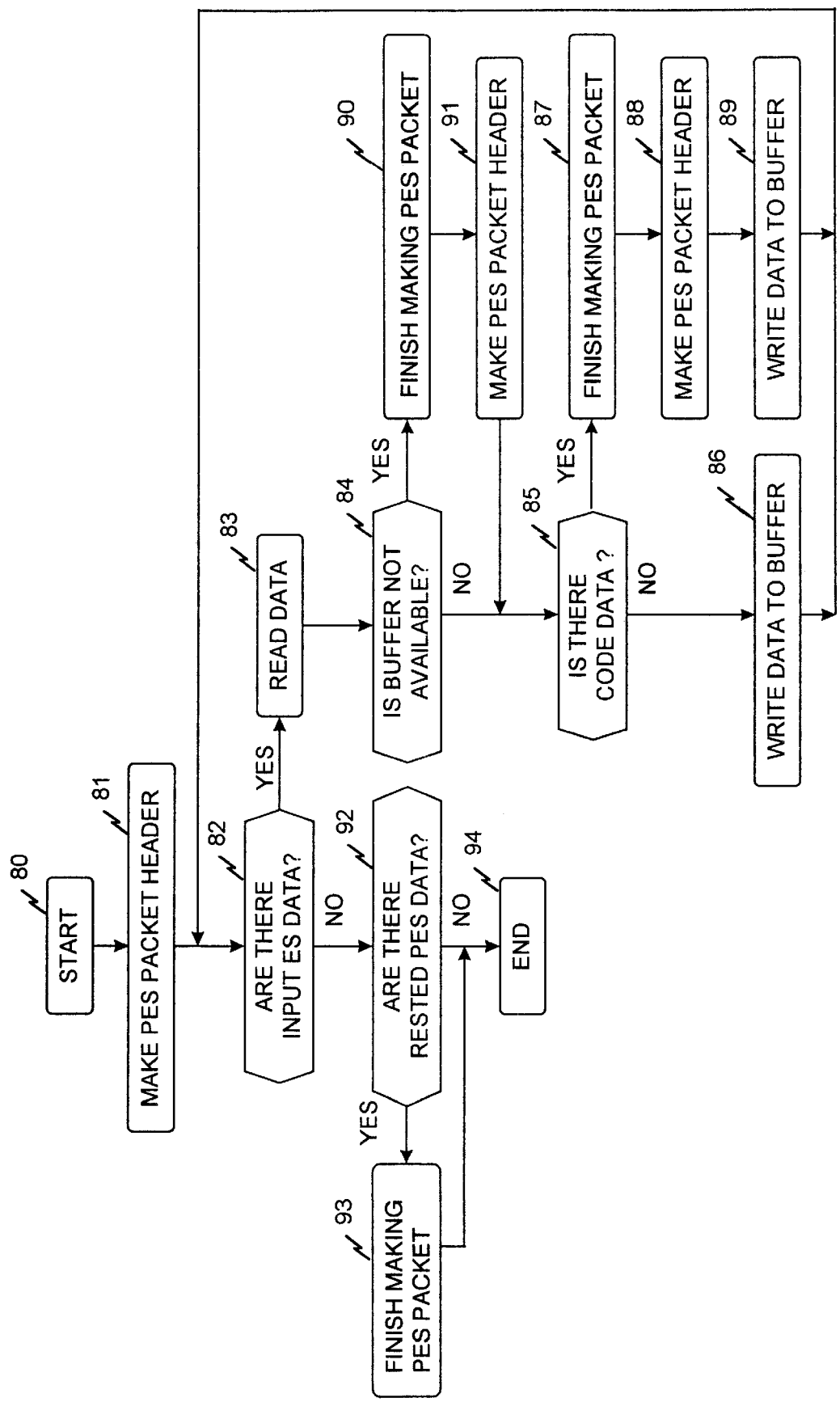
FIG. 4 is a flowchart of a process for converting the ES data to the PES packet.

Subsequently, a process for converting an elementary stream (ES) of FIG. 3 to a PES packet will be described with reference to a flowchart of FIG. 4:

(1) When a packetizing process starts, a program for converting the ES to the PES starts up. Thus, a PES packet header is made, and it is then determined whether there is input ES data (steps 80–82).

(2) If so at step 82, the ES data is read, and it is then determined whether there is an available area in a buffer for the PES packet data. While the buffer is set at a maximum data length in which the PES packet is transmittable, it may be set at another length (steps 83, 84).

(3) If there is an available area in the buffer in the determination of step 84, it is then determined whether the subsequently read ES data comprises a start code and a layer code (step 85).

(4) If not, the read ES data is written into the buffer for the PES packet data, and it is then determined whether there is ES data to be read next (steps 86, 82).

(5) When there is no available area in the buffer in the determination of step 84, making a PES packet is finished and a new PES packet header is made. It is then determined whether the read ES data comprises a start code and a layer code (steps 90, 91, 85).

(6) If so, making the PES packet is finished. Then, a new PES packet header is made, the read data is written into the buffer, and it is then determined whether there is ES data to be read next (steps 87–89, 82).

(7) If not, it is then determined whether there is an unfinished PES packet (step 92).

(8) If so, making the PES packet is finished and the processing is terminated (steps 93, 94). If not, the processing is terminated immediately (step 94).

The conversion of an elementary stream (ES) to a PES packet (PES) is effected in a manner as has been described above.

Figure 5:
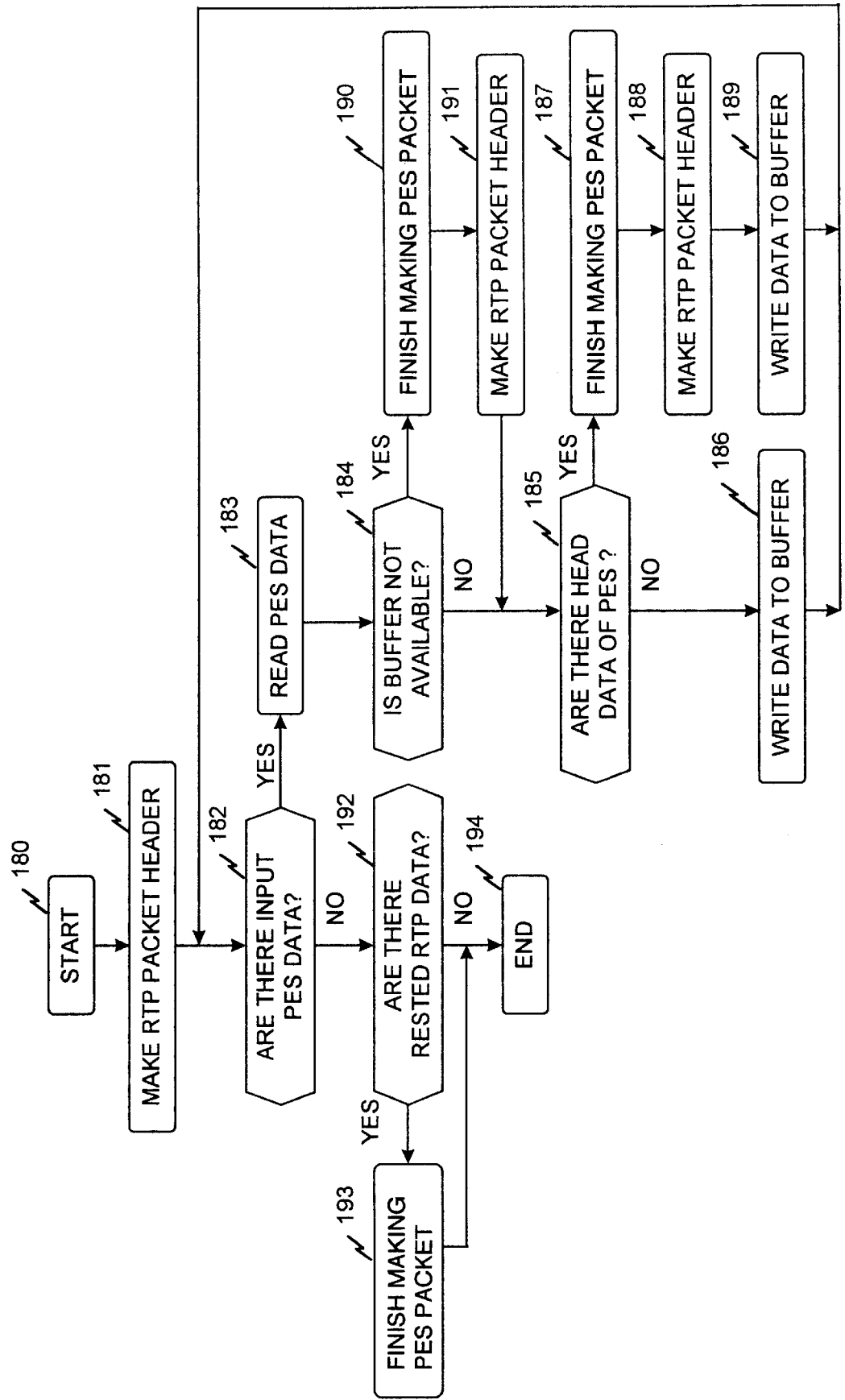
FIG. 5 is a flowchart of a process for converting the PES to the RTP packet.

The process for converting the PES packet to the RTP packet will be described with reference to a flowchart of FIG. 5:

(1) When a packetizing process starts, a program for converting the PES to the RTP packet starts. Thus, a RTP packet header is made, and it is then determined whether there is input PES data (steps 80–82).

(2) If so at step 182, the PES data is read, and it is then determined whether there is an available area in a buffer for the RTP packet data. While the buffer is set at a maximum data length (8168 bytes) in which the PES packet is transmittable, it may be set at another length (steps 183, 184).

(3) If there is an available area in the buffer in the determination of step 184, it is then determined whether the subsequently read PES data comprises head data of the PES header (step 185).

(4) If not, the read PES data is written into the buffer for the RTP packet data, and it is then determined whether there is PES data to be read next (steps 186, 182).

(5) When there is no available area in the buffer in the determination of step 184, making a RTP packet is finished and a new RTP packet header is made. It is then determined whether the read PES data comprises head data of the PES header (steps 190, 191, 185).

(6) If so, making the RTP packet is finished. Then, a new RTP packet header is made, the read data is written into the buffer, and it is then determined whether there is PES data to be read next (steps 187–189, 182).

(7) If not, it is then determined whether there is an unfinished RTP packet (step 192).

(8) If so, making the RTP packet is finished and the processing is terminated (steps 193, 194). If not, the processing is terminated immediately (step 194).

The conversion of the RTP packet to the UDP packet only comprises reading the RTP packet data, and annexing the UDP header to the head of the RTP packet data.

As described above, the low and high frequency component (low and high layer) data of the respective I, P and B frames are transmitted in different packets (in the above description, in the IP packets). When the transmission network becomes congested and packets are to be discarded, less significant data (in the specified frames and layers) alone are discarded in units of a packet at nodes (which are devices having the function of discarding or reproducing a packet) during the transmission, and instead, more significant data packets are transmitted preferentially. When video data of different qualities are multicast to a plurality of terminals (clients), packets which transmit data necessary for reproducing a video of a predetermined quality can be selectively reproduced and then transmitted. While the transmission of a layer-coded video signal has been described in the explanation of the invention, other layer data, for example, an acoustic signal coded for each layer, can be similarly transmitted. According to the present invention, a beneficial effect is easily produced in which when the network becomes congested, less significant acoustic signals are preferentially discarded.

While in the above the packetization and transmission of video signals (ES: Elementary Stream) layer-coded in the MPEG system have been illustrated specifically, the packetization and transmission of other layer data, for example layer-coded data in wavelet system and/or layer-coded acoustic data, are similarly possible. As described above, by each-layer packetization of data coded for each layer and transmission of such data to a layer-coded data receiver in a single channel system without using a plurality of channels, possible congestion of the transmission network is alleviated by preferentially discarding packets , starting with ones which transmit less significant layer video/sound data, so that a deterioration in the video/sound qualities is suppressed.

According to the inventive layer-coded data transmitting apparatus, one-video program data is transmitted in a single channel. Thus, when a plurality of video programs of layers are transmitted, the number of addresses and/or ports necessary for transmitting the video programs can be reduced. According to the inventive layer-coded data transmitting apparatus, when the transmission network becomes congested in the transmission of one-video program data in a single channel, only packets which transmit video data which less influence the image quality can be selectively discarded to suppress a deterioration in the image quality at that time. In addition, when layer-coded data is multicast to a plurality of terminals, only packets which transmit data of a specified frame and its frequency components can be selectively reproduced and transmitted. Thus, video data of a quantity appropriate for a processing capability of the receiving end can be transmitted to the receiving end.

What is claimed is:

1. A layer-coded data transmitting apparatus for transmitting layer-coded data in a single channel, comprising:

means for dividing into low and high frequency component data each of intra-encoded image data (I frame data), prediction-encoded image data (P frame data), and bidirectional prediction-encoded image data (B frame data), which a video signal compressing/encoding system prescribes; and for forming an internet protocol (IP) packet which transmits only each of the low and high frequency component data of each of the I, P and B frames; and means for transmitting the respective IP packets.

2. A layer-coded data transmitting apparatus for transmitting layer-coded data in a single channel, comprising:

means for dividing into low and high frequency component data each of intra-encoded image data (I frame data), prediction-encoded image data (P frame data), and bidirectional prediction-encoded image data (B frame data), which a video signal compressing/encoding system prescribes; and means for transmitting in different packets the respective low and high frequency component data of each of the I, P and B frame data.

* * * * *